United States Patent

[11] 3,607,805

| [72] | Inventors | Raymond E. Meyers<br>Westchester, Ill.;<br>Edgar W. Eubanks, Westview Village, Ohio |
|---|---|---|
| [21] | Appl. No. | 791,499 |
| [22] | Filed | Jan. 15, 1969 |
| [45] | Patented | Sept. 21, 1971 |
| [73] | Assignee | SCM Corporation<br>Cleveland, Ohio |

[54] PROCESS FOR STABILIZING VINYL HALIDE RESINS
9 Claims, No Drawings

[52] U.S. Cl. ........................................... 260/23 EP,
260/23 R, 260/23 XA, 260/29.6 PT, 260/29.7 R,
260/29.7 PT, 260/45.7 R, 260/45.8 A
[51] Int. Cl. ........................................... C08f 47/00,
C08f 45/58
[50] Field of Search ........................................... 260/23 EP,
23 EM, 23 X, 29.7, 29.6 PT, 29.7 PT, 30.4 A, 34.2

[56] References Cited
UNITED STATES PATENTS

| 1,967,861 | 7/1934 | Collins | 260/6 |
| 2,245,040 | 6/1941 | Marks | 23/243 |
| 3,438,920 | 4/1969 | Halper | 260/23.7 |
| 3,467,611 | 9/1969 | Wolinski | 260/29.6 |
| 3,468,828 | 9/1969 | Perrins et al. | 260/23.7 |
| 3,499,860 | 3/1970 | Penneck | 260/23 |
| 3,047,415 | 7/1962 | Rhodes et al. | 117/21 |

*Primary Examiner*—Donald E. Czaja
*Assistant Examiner*—H. S. Cockeram
*Attorneys*—Merton H. Douthitt, Harold M. Baum and Howard G. Bruss, Jr.

ABSTRACT: A method for improving the thermal stability of vinyl halide resins formed by dispersion polymerization techniques is disclosed. To achieve this improved stability an effective amount of a hydrophobic, lipophilic organic epoxide compound is admixed with the polymerization dispersion after the polymerization is substantially completed, but before the vinyl halide resin is separated from the aqueous polymerization medium.

PROCESS FOR STABILIZING VINYL HALIDE RESINS

Polymeric and copolymeric vinyl halide resins have found wide acceptance in forming sheet stock, containers and other molded parts by a variety of forming operations including blow molding, compression molding, injection molding, calendering, sheet forming, extrusion, and the like. Additionally, such resins have been employed in formulating a wide variety of decorative and functional coating compositions. These forming and coating applications often require elevated temperatures to achieve resin plasticity in fabricating the desired geometric shape or forming a smooth glossy surface coating.

Unfortunately, vinyl halide resins are subject to degradation and deterioration upon exposure to elevated temperatures, and gradually become dark and brittle as a result of the in situ generation of the corresponding hydrogen halide. This deterioration is so pronounced in many vinyl halide resins that a noticeable darkening often occurs upon storage under the influence of light, normal storage temperatures, atmospheric oxygen and moisture.

To overcome this instability, stabilizers are often "dry blended" with vinyl halide resins together with plasticizers, lubricants and fillers when the resin is milled on heated rollers preparatory to an extrusion or molding fabrication process. Similarly, stabilizers are dissolved together with the resins in various solvents to form solutions for surface coating applications. The present invention eliminates the need for the addition of a stabilizer at the point of application, and provides a method of incorporating the stabilizer into the resin during the resin polymerization process.

According to the present invention, vinyl halide resins, which are polymerized in an aqueous dispersion, are stabilized against subsequent thermal degradation by incorporating into the aqueous dispersion a hydrophobic, lipophilic organic epoxide compound.

It is common practice today to polymerize vinyl halide monomers to form particulate polymeric halide resins wherein said monomer is polymerized in the presence of an aqueous medium to form a dispersion of resin particles in said aqueous medium, and then recovering the polymeric vinyl halide resin from the aqueous medium. The term "polymerize" has been used and refers to homopolymerization of a vinyl halide monomer or the copolymerization of two or more ethylenically unsaturated monomers at least one of which monomers is a vinyl halide monomer.

One industrially significant method of vinyl polymerization in an aqueous dispersion is known as "suspension polymerization." In this method the vinyl halide resins are polymerized from monomers in suspension in an aqueous medium. Generally, this technique involves suspending the monomers in an aqueous medium containing nonmicelle forming suspending agents. Suspending agents suitable for this purpose are hydrophilic, materials such as a gelatin, polyvinyl alcohol, methyl cellulose, ethyl cellulose, polyacrylic acid, polymaleic acid and the like. The gelatin, polyvinyl alcohol and methyl cellulose are probably most widely used.

The polymerization or copolymerization reaction is promoted by the presence of a free radical initiator which is soluble in the monomer phase of the suspension, such as organic peroxides and hydroperoxides. Among the peroxides used are benzoyl peroxide, acyl and alkyl peroxides, including acetyl benzoyl peroxide, 0-chlorobenzoyl peroxide, alkoxy benzoyl peroxides and lauroyl peroxide. Ionic initiators which react with the aqueous medium are unsuitable.

The aqueous phase and the monomer phase are agitated together so as to suspend or disperse the former in the latter (i.e., the monomer is the dispersed phase and the aqueous medium is the continuous phase). The temperature of the mass is adjusted to initiate the polymerization reaction. Usually, this temperature is in the range of 80–200° F. and temperatures of about 100–150° F. are common. The dispersed monomer becomes polymerized and yields a suspension of granular resin in the aqueous medium. Polymerization periods vary from 2 hours and less to 20 hours and longer depending on the degree of conversion required. From this aqueous suspension the polymerized resin is isolated by filtration, washed with water and dried.

The properties of the vinyl halide resin produced can be tailored for a particular use by controlling the polymerization variables. These variables include the ratio of monomer to water, the choice of suspending agent, the inclusion of various emulsifiers, buffers and other additives, choice and amount of free radical initiator employed and the type of processing equipment utilized. In the suspension polymerization method the resins produced are free-flowing particles of varying particle size.

These polymerizable monomers employed include primarily vinyl halides such as vinyl chloride, vinyl bromide, vinyl fluoride, vinylidene halides, as well as copolymerizable mixtures of vinyl halide monomers and other ethylenically unsaturated monomers such as vinyl halide (e.g., chloride)/vinylidene halide (e.g., chloride) monomer mixtures and vinyl halide (e.g., chloride)/vinyl ester e.g., acetate) monomer mixtures as well as monomer mixtures of vinyl halides. Other vinyl-containing monomers which can be copolymerized with vinyl halides include vinyl ketones such as vinyl butyl ketone, dienes such as butadiene, acrylonitrile, the acrylates and lower alkyl esters of maleic and fumaric acid, and monomer mixtures of vinyl halide and another vinyl ester such as an acrylic compound, e.g., an alkyl methacrylate). Accordingly, as used herein, the term "vinyl halide monomer" includes polymerizable vinyl halide monomers and copolymerizable mixtures of vinyl halide monomers and other ethylenically unsaturated monomers. Numerous other polymerizable vinyl halide monomers are known to those skilled in the art.

In practicing the present invention, the organic epoxide stabilizer can be added to the polymerization dispersion at any point after the polymerization is substantially complete. When the organic epoxide is added before the polymerization is substantially completed, the epoxide may react with the vinyl monomer to form a resinous polymer having undesirable properties.

The epoxide can be mixed into the polymerization dispersion after the polymerization is completed and before the resin is filtered from the aqueous medium. Under these conditions the epoxide compound, being lipophilic and hydrophobic, tends to form a coating on the individual resin particles within the dispersion. When the particles are subsequently filtered from the aqueous medium, the epoxide coating remains intact. The epoxide can also be mixed with the resin particles after the filtration and before the drying step although this is usually economically impractical because of the additional mixing operation involved.

One of the important advantages of the present invention is that it stabilizes the resin against thermal degradation during the initial drying step. Because the resin has better thermal stability, increased drying efficiency can be attained through higher drying temperatures. This advantage is not realized by the prior art methods. A second advantage of the present invention is that it is no longer necessary to incorporate stabilizers at the point of application.

The exact mechanism by which the epoxide compound stabilizes the vinyl halide polymer is not known although it is theorized that the oxirane linkage reacts with any hydrogen chloride that is liberated in situ.

The amount of epoxide required to stabilize a vinyl halide polymer depends upon the type of vinyl halide resin, the severity of the service intended, and the oxirane oxygen content of the epoxide. The amount of epoxide required to achieve a given degree of stability decreases as the epoxide oxirane oxygen content increases. For most ordinary applications, hydrophobic, lipophilic epoxides having an oxirane oxygen content of at least about 1 percent by weight incorporated with the vinyl halide resin in the proportion of about 0.01 percent to about 5 percent by weight of the resin is satisfactory. Usually the oxirane oxygen content of the epoxide is about 5 percent by weight or greater in the interest of efficiency and economy. Under these conditions the epoxide compound is used in the proportion of about 0.1 percent to about 2 percent by weight of the resin.

The hydrophobic, lipophilic epoxide compounds have at least one active oxirane group

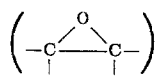

in their molecular structure. Usually the epoxide compound contains at least 1 percent by weight of oxirane oxygen and preferably about 5-10 percent by weight for economy and efficiency.

Suitable organic epoxy compounds include epoxidized fatty acids, epoxidized fatty acid esters and liquid epoxy resins.

The expoxidized fatty acids include epoxidized $C_{10}$-$C_{30}$ saturated and unsaturated fatty acids such as lauric, capric, myristic, palmitic, stearic, oleic, linoleic, linolenic, arachidic, lignoceric and the like.

The epoxidized fatty acid esters include the epoxidized fats and oils such as epoxidized animal, vegetable, and marine triglycerides. These fats and oils can often be epoxidized to contain at least about 5 percent by weight of oxirane oxygen. These epoxidized triglycerides include epoxidized cottonseed oil, soybean oil, corn oil, menhaden oil, whale oil, linseed oil, cocoanut oil, tung oil, castor oil and the like. The epoxidized drying and semidrying oils such as soybean, linseed, cottonseed, perilla, rapeseed, and fish oils are particularly useful in that these oils contribute siccative properties in addition to the stabilizing properties. Other fatty acid esters of polyhydric alcohols of two to six carbon atoms such as the glycol, 2, 3 butanediol, and erythritol esters of the epoxy containing aliphatic carboxylic acids having 10 to 30 carbon atoms are also suitable. Such esters include erythritol esters of epoxidized soybean oil, glycol esters of epoxidized stearic acid, 2, 3 butanediol esters of epoxidized oleic acid and the like.

The known fatty resinous epoxy compositions having terminal epoxy groups such as liquid low molecular weight glycidyl polyethers with polyhydric alcohols can also be employed. Those polyethers obtained by reacting epichlorohydrin with a dihydric phenol in an alkaline medium are commercially available and particularly satisfactory.

Illustrative of suitable epoxy resins are the glycidyl ethers of polyhydroxy alcohols such as the glycidyl ethers of glycerol, glycidyl ethers of bisphenol A, glycidyl ethers of bisphenol F, glycidyl ethers of long-chain bisphenols and epoxylated novolac resins. It will be appreciated by those skilled in the art that many of the above described epoxy compounds have plasticizing properties. When these compounds are used, the amount of other plasticizers employed can be correspondingly reduced.

The high oxirane polyepoxides having an oxirane oxygen content in excess of 5 percent by weight are particularly desirable because these materials provide more epoxy sites per unit weight for reaction with hydrogen halide.

In carrying out the present dispersion polymerization process the vinyl halide monomers, water, monomer, free radical initiator, suspending agent (and emulsifiers and buffers when these agents are employed) are charged to an agitated reactor vessel equipped with heating and cooling means. The ratio of water to vinyl halide monomer is usually in the range of about 2 to 5 parts of water per part of monomer. The suspending agents are usually about 0.1 percent-0.5 percent by weight of the monomer charged. The emulsifiers, when they are used, are less than about 0.1 percent. The monomer soluble free radical initiator is used in an amount ranging from about 0.1 percent-0.5 percent of the monomer charged.

The reaction vessel is then purged of air with vinyl chloride of an inert gas such as nitrogen. The temperature is then brought to about 100-200° F. to initiate the polymerization. The pressure employed is sufficient to keep the polymerization emulsion from boiling at the selected temperature and should be sufficient to maintain the monomer in the liquid state. A typical pressure range is about 15-100 p.s.i.g. The polymerization, once initiated, liberates heat and the heat must be removed from the reactor. Polymerization then proceeds for several hours until the desired degree of conversion has been obtained.

After the polymerization is completed the unpolymerized monomer is stripped from the polymerization dispersion and recovered for reuse. The epoxide stabilizer can be mixed into the polymerization dispersion at this stage of the process. The epoxide is merely charged to the polymerization batch while agitation is continued. The epoxide being lipophilic and hydrophobic is selectively attracted to the resin particles. The resin particles are then removed from the dispersion by filtration. Centrifugal filtration is commonly employed. The polymer is also washed with water during the filtration to remove adhering buffers, emulsifiers, and suspending agents. This filtration operation lowers the water content of the polymer to about 20-30 percent.

The filtered polymer is then dried at about 250-350° F. for several minutes to reduce the water content to less than 1 percent. The granular dry resin is then ready for use.

Another common method of dispersion polymerization is known as emulsion polymerization. This method is similar to the suspension type polymerization described above except that the monomers are polymerized in micellelike agglomerates in the aqueous dispersion to form a latex. The latex is then dewatered to the degree desired.

The following examples are illustrative of the present invention, although they should not be construed as limiting. All parts are parts by weight and all percentages are weight percentages unless indicated otherwise.

Example 1

One hundred parts of vinyl chloride monomer, 2.5 parts of benzoyl peroxide, 0.1 parts methyl cellulose and 220 parts of deionized water are charged to a jacketed agitated reactor set up for both heating and cooling. The reactor is purged with vinyl chloride and nitrogen is introduced into the vapor space. The reactor is then closed, the reaction mixture is agitated and the temperature is brought to about 160-170° F. at a pressure of 70 p.s.i.g. These conditions are maintained for 3 hours. At the end of this period, the temperature is lowered to about 120° F. and maintained for about 20 hours. At the end of this 20-hour reaction period, an aqueous dispersion of polymeric vinyl chloride resin particles is obtained. The unreacted vinyl chloride is vented and one part of a liquid epoxidized linseed oil having an oxirane oxygen content of about 9.3 percent by weight, a saponification number of about 175, an iodine value of about 5 and an acid number of about 0.3 is charged to the polymerization dispersion while agitation is continued. After the reactor had been agitated for about 10 minutes to assure intimate mixture between the epoxidized oil and the polymerization dispersion, the reaction mass is cooled to about 80° F. and centrifuged. The filter cake comprises resinous granules containing about 25 percent by weight of water. The filter cake is washed with the water and then dried to less than 1 percent moisture at about 300° F. The resulting product is a thermally stable, free-flowing, white, vinyl chloride resin suitable for use in surface coatings and other applications. The vinyl chloride resin is more resistant to darkening upon thermal exposure than a similar resin that had been prepared in the absence of the epoxidized oil. The resin is suitable for use in molding or coating applications.

Example 2

The experimental procedure of example 1 is repeated except that the monomer comprises a mixture of 85 parts of vinyl chloride and 15 parts of vinyl acetate, rather than 100 parts of vinyl chloride; and the epoxidized oil is two parts of a liquid epoxidized soybean oil having an oxirane oxygen content of about 6 percent by weight and an iodine number of about five. The resulting copolymeric vinyl chloride/vinyl acetate resin is in the form of white free-flowing granules. The vinyl chloride/vinyl acetate resin is more resistant to darkening upon thermal exposure than a similar resin that had been prepared in the absence of the epoxidized oil. The resin is suitable for use in molding or coating applications.

Example 3

About 180 parts of the resin produced in example 2 are dissolved in a solvent mixture comprising about 50 parts of toluene, 20 parts of methyl ethyl ketone, 3 parts of methyl isobutyl ketone and 15 parts of acetone. The resulting resin solution is clear. The resin solution is sprayed, using an atomizing type spray gun, onto the interior of a metal beverage container to form a coating of about 0.1 to 0.2 mils in thickness thereon. The coating was then fused for about 11 minutes at 305° F. to form a clear, nonyellow, resinous protective film thereon.

Example 4

One hundred parts of the resin produced in example 1 are blended with about five parts of chlorinated polyethylene (impact modifier), 0.5 parts of ultraviolet absorber and 0.5 parts of lubricant on a two-roll laboratory mill at 310° F. for 10 minutes to form a sheet stock of 20-mil thickness. The sheet stock is clear, thermally stable, and nonyellow and is suitable for use in outdoor applications without the addition of further stabilizers.

Having thus described the invention, what is claimed is:

1. A process for preparing vinyl halide resin particles having improved stability against thermal discoloration comprising the steps of:
   polymerizing at least one vinyl halide monomer in an aqueous medium to form a dispersion containing vinyl halide resin particles;
   admixing with said dispersion a sufficient amount of a hydrophobic, lipophilic, organic epoxide compound to improve the stability of said vinyl halide resin particles against thermal discoloration;
   filtering said resin particles from said aqueous medium; and
   drying the resultant filtered resin particles.

2. The method of claim 1 wherein an ethylenically unsaturated monomer is copolymerized with said vinyl halide monomer.

3. The method of claim 1 wherein said organic epoxide compound has an oxirane oxygen content of at least about 1 percent by weight, and is admixed in the proportion of about 0.01 percent to about 5 percent by weight of said resin particles.

4. The method of claim 3 wherein said epoxide compound is an epoxidized fatty acid, epoxidized fatty ester, or a liquid epoxy resin.

5. The method of claim 3 wherein said at least one vinyl halide monomer comprises vinyl chloride monomer.

6. The method of claim 4 wherein said epoxide compound contains between about 5 percent and about 10 percent by weight of oxirane oxygen, and is admixed in the proportion of about 0.1 percent to about 2 percent by weight of said resin particles.

7. The method of claim 4 wherein said epoxidized fatty acid ester is an epoxidized fat or oil.

8. The method of claim 7 wherein said at least one vinyl halide monomer comprises vinyl chloride monomer.

9. The method of claim 8 wherein vinyl acetate monomer is copolymerized with said vinyl chloride monomer.